US009451098B2

(12) United States Patent
Zhu et al.

(10) Patent No.: US 9,451,098 B2
(45) Date of Patent: Sep. 20, 2016

(54) SYSTEM AND METHODS FOR DYNAMIC SIM PROVISIONING ON A DUAL-SIM WIRELESS COMMUNICATION DEVICE

(71) Applicant: QUALCOMM Incorporated, San Diego, CA (US)

(72) Inventors: Xipeng Zhu, Beijing (CN); Zhimin Du, Beijing (CN); Junan Jiang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/521,082

(22) Filed: Oct. 22, 2014

(65) Prior Publication Data

US 2015/0304506 A1    Oct. 22, 2015

Related U.S. Application Data

(63) Continuation of application No. PCT/CN2014/075475, filed on Apr. 16, 2014.

(51) Int. Cl.
*H04M 1/00* (2006.01)
*H04M 15/00* (2006.01)
(Continued)

(52) U.S. Cl.
CPC ......... *H04M 15/8011* (2013.01); *H04M 15/49* (2013.01); *H04W 8/205* (2013.01); *H04W 12/04* (2013.01); *H04W 88/06* (2013.01)

(58) Field of Classification Search
CPC . H04W 68/005; H04W 88/06; H04W 8/205; H04W 48/02; H04W 4/001; H04W 4/003; H04W 68/02; H04W 8/183; H04W 12/08; H04W 36/14; H04W 48/18; H04W 4/16; H04W 60/005; H04W 76/025; H04W 8/18; H04W 8/26; H04W 8/265; H04W 88/02; H04W 12/06; H04W 12/04; H04L 61/6077; H04L 63/105; H04M 15/49; H04M 15/8011; H04M 2203/651; H04M 3/42382; H04M 2250/14; H04B 1/3816
USPC ................ 455/558, 406, 411, 415, 418, 419, 455/426.1, 432.1, 458; 370/331; 379/15.03
See application file for complete search history.

(56) References Cited

U.S. PATENT DOCUMENTS 8,634,828 B2    1/2014 Shi et al.
8,639,245 B2    1/2014 Shi et al.
(Continued)

FOREIGN PATENT DOCUMENTS

CN    102917339    *    2/2013    ............. H04W 8/04
CN    102917339 A        2/2013
(Continued)

OTHER PUBLICATIONS

International Search Report and Written Opinion—PCT/CN2014/075475—ISA/EPO—Jan. 28, 2015.

*Primary Examiner* — Allahyar Kasraian
*Assistant Examiner* — B. M. M Hannan
(74) *Attorney, Agent, or Firm* — The Marbury Law Group, PLLC

(57) ABSTRACT

Methods and devices for dynamic VSIM provisioning on a multi-SIM wireless device having a first SIM as a Universal Integrated Circuit Card (UICC) and a virtual SIM (VSIM). A provisioning server may receive updated information from the wireless device, and based at least partially on the received information, determine whether the SIM profile on the VSIM of the wireless device should be changed. To change the SIM profile, the provisioning server may determine whether remote credential management procedures are enabled. If so, the provisioning server may select a new SIM profile from a plurality of SIM profiles, and provision the new SIM profile in the VSIM using remote credential management procedures. If remote credential management procedures are unavailable, the provisioning server may select a remote SIM from a plurality of remote SIMs associated with the provisioning server, and run the remote SIM to execute authentication processes for the wireless device.

30 Claims, 8 Drawing Sheets

(51) Int. Cl.
*H04W 8/20* (2009.01)
*H04W 12/04* (2009.01)
*H04W 88/06* (2009.01)

(56) References Cited

U.S. PATENT DOCUMENTS

| | | | |
|---|---|---|---|
| 8,649,789 B2 | 2/2014 | Shi et al. | |
| 8,863,256 B1* | 10/2014 | Addepalli | H04W 4/046 713/168 |
| 2010/0210304 A1* | 8/2010 | Huslak | G06Q 10/10 455/558 |
| 2010/0311391 A1* | 12/2010 | Siu | H04W 8/205 455/411 |
| 2010/0311402 A1* | 12/2010 | Srinivasan | H04W 8/183 455/418 |
| 2010/0311468 A1* | 12/2010 | Shi | H04W 4/003 455/558 |
| 2011/0028135 A1* | 2/2011 | Srinivasan | H04M 3/42382 455/415 |
| 2011/0269456 A1* | 11/2011 | Krishnaswamy | H04W 8/26 455/426.1 |
| 2011/0306318 A1* | 12/2011 | Rodgers | H04W 8/183 455/410 |
| 2012/0309374 A1 | 12/2012 | Tagg et al. | |
| 2013/0023235 A1* | 1/2013 | Fan | H04W 48/18 455/411 |
| 2013/0165073 A1* | 6/2013 | Madsen | H04W 12/06 455/411 |
| 2014/0051423 A1 | 2/2014 | Marsden et al. | |
| 2014/0057600 A1* | 2/2014 | Dung | H04W 8/02 455/411 |
| 2015/0057044 A1* | 2/2015 | Altman | H04W 4/003 455/558 |
| 2015/0120135 A1* | 4/2015 | Lawrenson | B60W 50/085 701/36 |
| 2015/0282060 A1* | 10/2015 | Huang-Fu | H04W 48/18 45/435.2 |

FOREIGN PATENT DOCUMENTS

| | | |
|---|---|---|
| CN | 103067543 A | 4/2013 |
| WO | 2011023008 A1 | 3/2011 |
| WO | 2013188545 A1 | 12/2013 |

* cited by examiner

SYSTEM AND METHODS FOR DYNAMIC SIM PROVISIONING ON A DUAL-SIM WIRELESS COMMUNICATION DEVICE

RELATED APPLICATIONS

This application is a continuation of PCT/CN2014/075475, entitled "System and Methods for Dynamic SIM Provisioning on a Dual-SIM Wireless Communication Device" filed on Apr. 16, 2014, the entire contents of which are hereby incorporated herein by reference.

BACKGROUND OF INVENTION

Current wireless communication devices may be configured to support cellular network communications using a variety of technologies and formats depending on the service provider of choice. In order to store the necessary provisioning data that allows the mobile device to communicate with a wireless communications network, wireless communication devices may utilize a subscriber identification module (SIM) provided on a smart card such as a universal integrated circuit card (UICC).

Multi-SIM wireless devices have become increasingly popular because of their flexibility in service options and other features. A dual-SIM dual-active (DSDA) device, which is a type of multi-SIM wireless device configured with two radios and two SIMs, allows simultaneous active connections with the networks corresponding to two SIMs. DSDA devices typically have separate transmit/receive chains associated with each SIM. A dual-SIM dual-standby (DSDS) device, which is a type of multi-SIM wireless device configured with one radio and two SIMs, typically allows selective communication on a first network while listening for pages on a second network. Both types of dual-SIM wireless devices may allow a user to implement two different wireless communication service subscriptions or plans with different service providers, with separate numbers and bills, on the same device (e.g., business account and personal account).

During travel, users may obtain and install local SIM cards in their wireless devices in order to pay local call rates in the destination country. By using multiple SIMs, a user may take advantage of different service pricing plans and save on mobile data usage. However, users may be limited by the number of UICCs supported by the multi-SIM device (e.g., a dual-SIM device supports two UICCs). Further, users may be inconvenienced by having to use different telephone numbers (e.g., MSISDNs) for different local services, as well as by the barriers to accessing personal data (e.g., a contacts list that is normally stored on a SIM) across multiple SIMs. Moreover, while a user may obtain service while roaming from his or her home network operator without purchasing or installing additional SIMs, the user is often charged a very high fee for such service.

While a conventional UICC is typically implemented as a removable chip that is insertable into a wireless communication device, a UICC may alternatively be embedded in the wireless communication device (i.e., soldered and thus not removable) or in another chipset (e.g., a modem chipset) of the device, providing an embedded UICC (eUICC). An eUICC may implement a virtual SIM (VSIM) application that contains a profile enabling access to a network. For example, a profile may include of the data, authentication algorithms, cryptographic keys, and other information that makes up a subscription. Therefore, multiple subscriptions may be made available as VSIM applications capable of operating on an eUICC. However, a user may not know when to switch from one VSIM to another, such as due to entry into a roaming area. Further, when making a selection among the available subscriptions, a user may wish to consider a number of factors (e.g., cost, network coverage and services available, etc.).

SUMMARY

Systems, methods, and devices of various embodiments enable dynamic provisioning of a new SIM profile for a VSIM on a multi-SIM wireless communication device having a first SIM implemented on a universal integrated circuit Card (UICC) and a second SIM implemented as a virtual SIM (VSIM) stored in memory of the wireless communication device, such as on an embedded UICC (eUICC) or in other memory when the VSIM is implemented in software executing on the wireless communication device. The embodiment methods may include receiving, by a provisioning server, updated information from the wireless device, determining, based at least in part on the received updated information, whether to change the VSIM of the wireless device, and determining whether remote credential management procedures are enabled by the provisioning server in response to determining that the VSIM of the wireless device should be changed. In some embodiment systems, methods and devices, the updated information received from the wireless device may include one or more of information indicating whether the device is currently roaming, information indicating differences in the quality, cost or type of services offered by a plurality of network operators providing local service, a user preference implemented as a setting on the wireless device, and a data limit of a tariff plan currently associated with the VSIM.

Embodiment methods may also include selecting a new SIM profile from a plurality of SIM profiles associated with the provisioning server in response to determining that remote credential management procedures are enabled by the provisioning server, and provisioning the new SIM profile in the VSIM using remote credential management. The operation of provisioning the new SIM profile in the VSIM may involve storing the new SIM profile in memory of the wireless communication device, such as on an eUICC or in other memory when the VSIM is implemented in software executing on the wireless communication device The plurality of SIM profiles associated with the provisioning server may be maintained in a subscription pool database. Embodiment methods may also include selecting a remote SIM from a set of SIMs available to the provisioning server in response to determining that remote credential management is not enabled, and remotely running the selected remote SIM.

In some embodiment systems, methods and devices, the remote SIM may provide basic provisioning information to the VSIM in the wireless device via secure tunneling of a bearer established by a serving network associated with the first SIM. In some embodiment systems, methods and devices, authentication processes may be performed between the remote SIM and a serving network associated with the remote SIM via a bearer established by the serving network associated with the first SIM.

Some embodiment systems and methods may also include establishing, through a virtual network operator associated with the provisioning server, a VSIM account with the wireless device, and receiving a payment to the virtual network operator from the established VSIM account upon selection of the new SIM profile. In some embodiment systems and methods, each of the plurality of SIM profiles associated with the provisioning server may correspond to one of a plurality of foreign network operators. In some embodiment systems and methods, the virtual network operator may pay a local rate to each of the foreign network operators for the corresponding SIM profiles.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
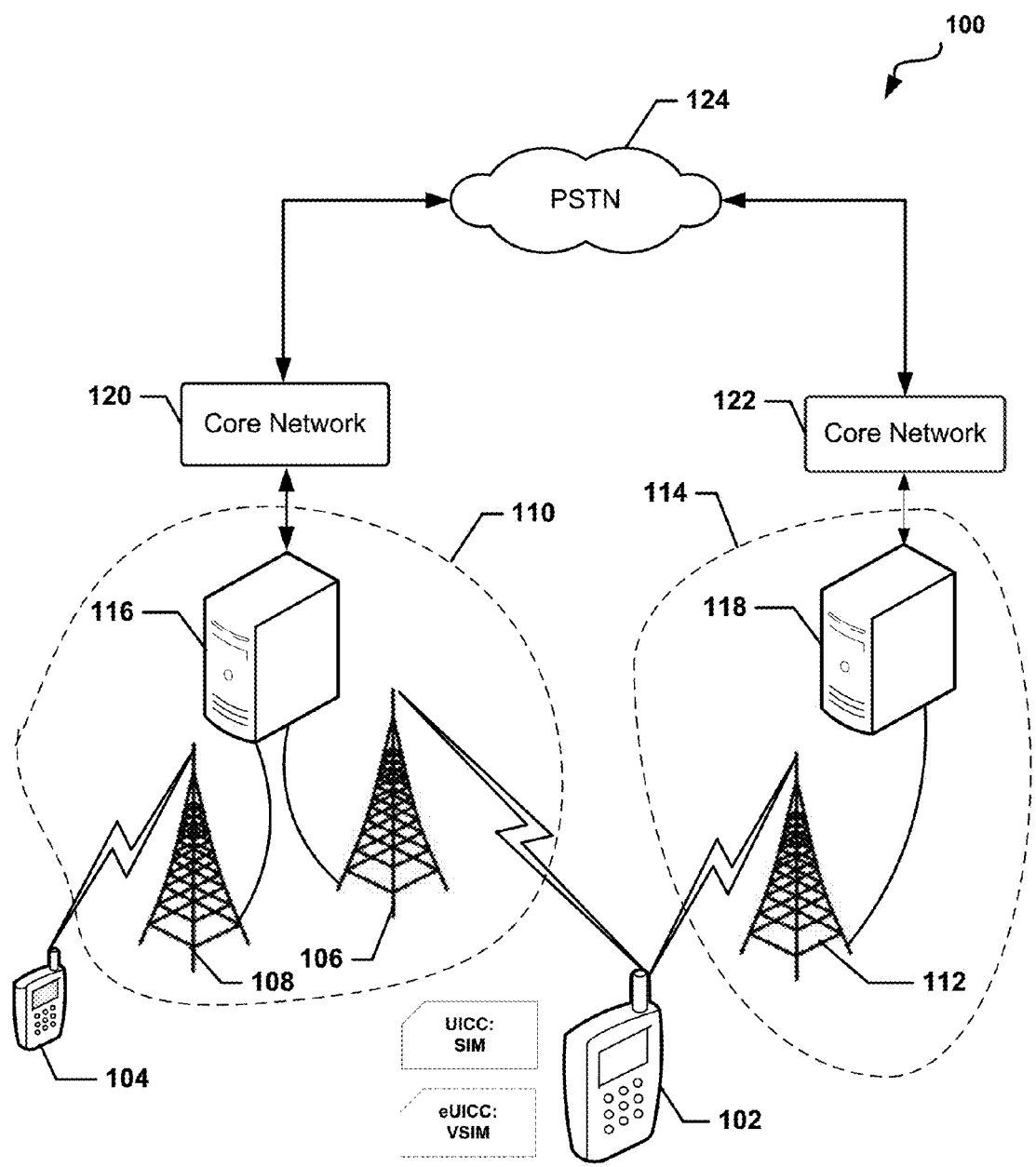
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "wireless communication device," "wireless device" and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor, memory and circuitry for establishing wireless communication pathways and transmitting/receiving data via wireless communication pathways.

The terms "subscriber identification module," "SIM," "universal subscriber identity module," "USIM," "removable user identity module," and "RUIM" are used interchangeably herein to mean a memory that may be an integrated circuit or embedded into a removable card, which stores an International Mobile Subscriber Identity (IMSI), related key, and/or other information used to identify and/or authenticate a wireless device on a network. In some networks (e.g., GSM networks) SIMs may store network specific information used to authenticate and identify subscribers on the network, the most important of which are the Integrated Circuit Card Identifier (ICCID), International Mobile Subscriber Identity (IMSI), Authentication Key ($K_i$), and Local Area Identity (LAI). The SIM may also store other carrier specific data, such as the SMSC (Short Message Service Centre) number, Service Provider Name (SPN), Service Dialing Numbers (SDN), and Value Added Service (VAS) applications. In various embodiments, a USIM and a RUIM may be modules in UMTS and CDMA networks, respectively, that provide equivalent functions to a SIM in a GSM network. However, the terms "SIM," "USIM," and "RUIM" may be used interchangeably herein to refer to a general module that is not restricted to a particular standard or technology.

The term SIM may also be used as shorthand reference to a communication network associated with a particular SIM, because the information stored in a SIM enables the wireless device to establish a communication link with a particular network, thus the SIM and the communication network, as well as the services and subscriptions supported by that network, correlate to one another.

The terms "universal integrated circuit card," "smart card," "SIM card," and "UICC" are used interchangeably herein to refer to a memory chip or integrated circuit used to provide a SIM, a USIM and/or RUIM, to a wireless device in order to store the described provisioning and/or other data. Various UICCs may have storage capabilities ranging from 2-3 KB to up to 1 gigabyte of information.

The terms "dual-SIM device," "multi-SIM wireless communication device," "multi-SIM wireless device," "dual-SIM dual-active device," "dual-SIM dual standby-device," "DSDA device," and "DSDS device" are used interchangeably herein to describe a wireless device that is configured with more than one SIM and is capable of handling communications with networks of all subscriptions.

The term "server" is used herein to refer to any of a variety of commercially available computer systems configured to operate in a client-server architecture. In particular, the term "server" refers to network servers, particularly Internet or Intranet accessible servers, which typically include a processor, memory (e.g., hard disk memory), and network interface circuitry configured to connect the server processor to the network, such as the Internet or a cellular telephone network.

A physical and/or standard UICC may have an internal structure as defined by International Organization of Standardization (ISO)/International Electrotechnical Commission (IEC) 7816-4, which is hereby incorporated by reference. Applicants that may be stored on the UICC are generally associated with an Application Dedicated File (ADF). The ADF may be part of a file structure under the master file (MF) or the ADF may exist separately within the UICC.

Wireless communication networks are widely deployed to provide various communication services such as voice, packet data, broadcast, messaging, and so on. These wireless networks may be capable of supporting communication for multiple users by sharing the available network resources. Examples of such wireless networks may include, but are not limited to, Global System for Mobile Communications (GSM) networks, Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's home service provider/carrier.

The various embodiments provide multi-SIM wireless devices with an expanded range of operator subscriptions for voice and packet data communications. By using the flexibility of current VSIM architectures and capabilities of multi-SIM wireless devices (e.g., DSDA or DSDS devices), the various embodiments may allow wireless device consumers to access a variety of reasonably priced service options while roaming and/or experiencing other service conditions. In this manner, the various embodiments may provide improved dynamic VSIM provisioning systems. In some embodiments, a dual-SIM wireless device may include a first SIM configured on a physical UICC, and a VSIM (also called a second SIM and second VSIM) implemented in memory of the wireless device, such as on an eUICC or in other memory when the VSIM is implemented in software executing on the wireless device. Such designations of a "first" and/or "second" SIM or VSIM herein are arbitrary and for ease of description and reference purposes only. In various embodiments, the VSIM may be implemented either in software (e.g., software executing on the device that stores provisioning data in memory) or in hardware (e.g., an eUICC), or in a combination of hardware and software.

FIG. 1 illustrates a wireless network system 100 suitable for use with the various embodiments. Wireless devices 102, 104 may be configured to establish wireless connections with cell towers or base stations of one or more radio access networks. For example, the wireless devices 102, 104 may transmit/receive data using base stations 106, 108, which may be part of a network 110, as is known in the art. The wireless device 102 may further be configured to transmit/receive data through base station 112, which may be part of a different network 114.

The wireless networks 110, 114 may be cellular data networks, and may use channel access methods including, but not limited to, Global System for Mobile Communications (GSM), Universal Mobile Telecommunications Systems (UMTS) (particularly, Long Term Evolution (LTE)), Frequency Division Multiple Access (FDMA), Time Division Multiple Access (TDMA), Code Division Multiple Access (CDMA), Wi-Fi, PCS, G-3, G-4, or other protocols that may be used in a wireless communications network or a data communications network.

The networks 110, 114 may also be referred to by those of skill in the art as access networks, radio access networks, base station subsystems (BSSs), UMTS Terrestrial Radio Access Networks (UTRANs), etc. The networks 110, 114 may use the same or different wireless interfaces and/or physical layers. In an embodiment, the base stations 106, 108, 112 may be controlled by one or more base station controllers (BSC) 116, 118. For example, the base stations 106, 108, BSC 116, and other components may form network 110, as is known in the art. Alternate network configurations may also be used and the embodiments are not limited to the configuration illustrated. For example, in another embodiment the functionality of the BSC 116 and at least one of the base stations 106, 108 may be collapsed into a single "hybrid" module having the functionality of these components.

In various embodiments, the wireless device 102 may access core networks 120, 122 after camping on cells managed by the base stations 106, 112. In some embodiments the wireless device 102 may be capable of simultaneously accessing the core networks 120, 122 (e.g., DSDA devices), while in other embodiments the wireless device 102 may only engage in one active communication at a time (e.g., DSDS devices). Each core network 120, 122 may provide various services to the wireless device 102 via respective connections to the networks 110, 114.

In the wireless network system 100, the wireless device 102 may be a multi-SIM wireless communication device that is capable of operating with a number of wireless networks enabled by information stored in a plurality of SIMs. Using dual-SIM functionality, the wireless device 102 may access the two core networks 120, 122 by camping on cells managed by the base stations 106, 112. For example, a multi-SIM wireless device 102 may participate in a voice or data communication with a third party device, such as the wireless device 104, using a service enabled by information stored in a first one of the SIMs, as well as the protocol stack associated with that SIM, via a radio resource. The multi-SIM wireless device 102 may also participate in a voice call or other data transmission from a third party in a similar manner using a service enabled by information stored in second of the SIMs, as well as the protocol stack associated with that SIM, via a radio resource. The third party device (e.g., wireless device 104) may be any of a variety of devices, including, but not limited to, a mobile phone, laptop computer, PDA, server, etc.). Some or all of the wireless devices 102, 104 may be configured with multi-mode capabilities and may include multiple transceivers for communicating with different wireless networks 120, 122 over different wireless links or radio access technologies.

The core networks 120, 122 may be interconnected by public switched telephone network (PSTN) 124, across which the core networks 120, 122 may route various incoming and outgoing communications to the wireless device 102.

In various embodiments, a dual-SIM wireless device 102 may attach to a network (i.e., serving network) enabled by the first SIM, and may use that attachment to ensure that a network connection is available to the provisioning server for the VSIM.

Figure 2:
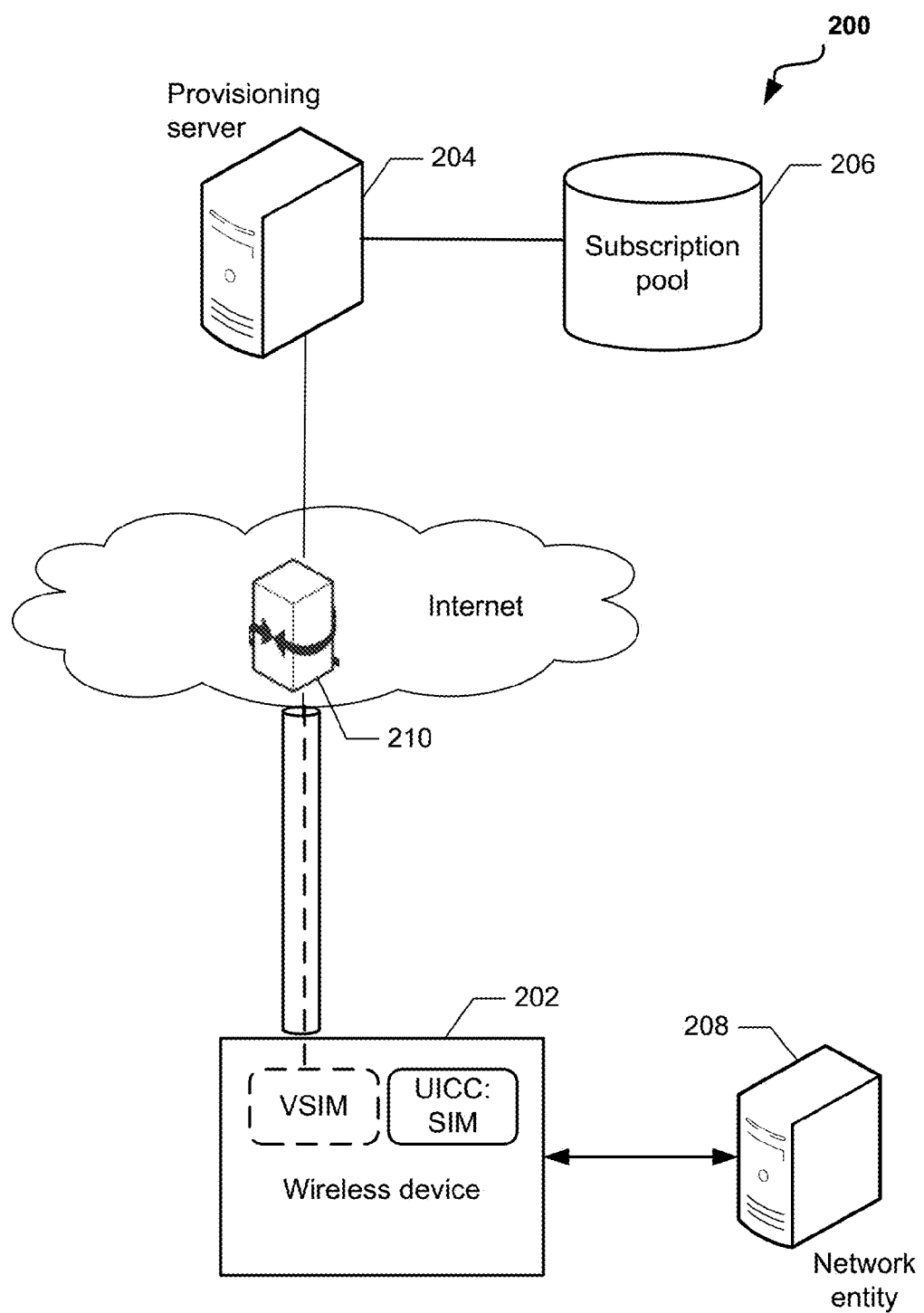
FIG. 2 is a system block diagram of a subscription management system suitable for use with the various embodiments.

FIG. 2 illustrates a subscription management system 200 that may provide dynamic VSIM provisioning for at least one multi-SIM wireless device 202 (e.g., wireless device 102 in FIG. 1). Functional components of the subscription management system 200 may be distributed between various entities in a number of other configurations that are not shown, and which may depend on settings of the at least one wireless device, a network operator, a chipset manufacturer, etc.

In various embodiments, the system 200 may utilize a connection on a first SIM of the wireless device 202 to dynamically provision a VSIM selected for improved service on the wireless device when roaming. The wireless device 202 may include a UICC that stores a first SIM, an eUICC that may implement various VSIMs, and/or VSIM software that implements various VSIMs using device memory. The system 200 may also include at least one provisioning server 204, and an associated subscription pool database 206. In various embodiments, the provisioning server 204 may be a subscription manager or a SIM server associated with a virtual network operator (e.g., as discussed with reference to FIG. 3). Further, in various embodiments the subscription pool database 206 may store a group of SIM profiles, or may provide access to a set of physical UICCs that are each configured with a SIM.

The system 200 may also include at least one network entity 208 of at least one network operator configured to provide service to the first SIM on a wireless communication network. In some embodiments, the network entity 208 may belong to a Long Term Evolution (LTE) network (e.g., an eNodeB and/or a mobility management entity (MME)). In other embodiments, the network entity 208 may belong to a UTRAN network (e.g., a nodeB). As such, connecting to at least one network entity 208 may involve assignment of an IP bearer (e.g., a default or dedicated IP bearer) or a PDP context (e.g., a primary or secondary PDP context). In various embodiments, an IP bearer or PDP context may provide the wireless device 202 with IP connectivity to a PDN for accessing the interne, for example, through a gateway 210 (e.g., a PDN gateway (P-GW) or gateway GPRS support node (GGSN)). Therefore, in various embodiments the wireless device 202 may use the bearer or context for the packet data network to send Internet packets to and receive Internet packets from the provisioning server.

Those of skill in the art will recognize that various components of an embodiment system 200 may be co-located in a single physical device, and/or the functions thereof may be performed by any of a number of other components.

The various embodiments may provide at least two approaches for dynamically provisioning a VSIM of at least one multi-SIM wireless device 202 to improve roaming and/or local service. The first approach may be applied when remote credential management is available for the second SIM (i.e., VSIM), while the second approach may be applied if the wireless device 202 is in an area without remote credential management capability.

Figure 3:
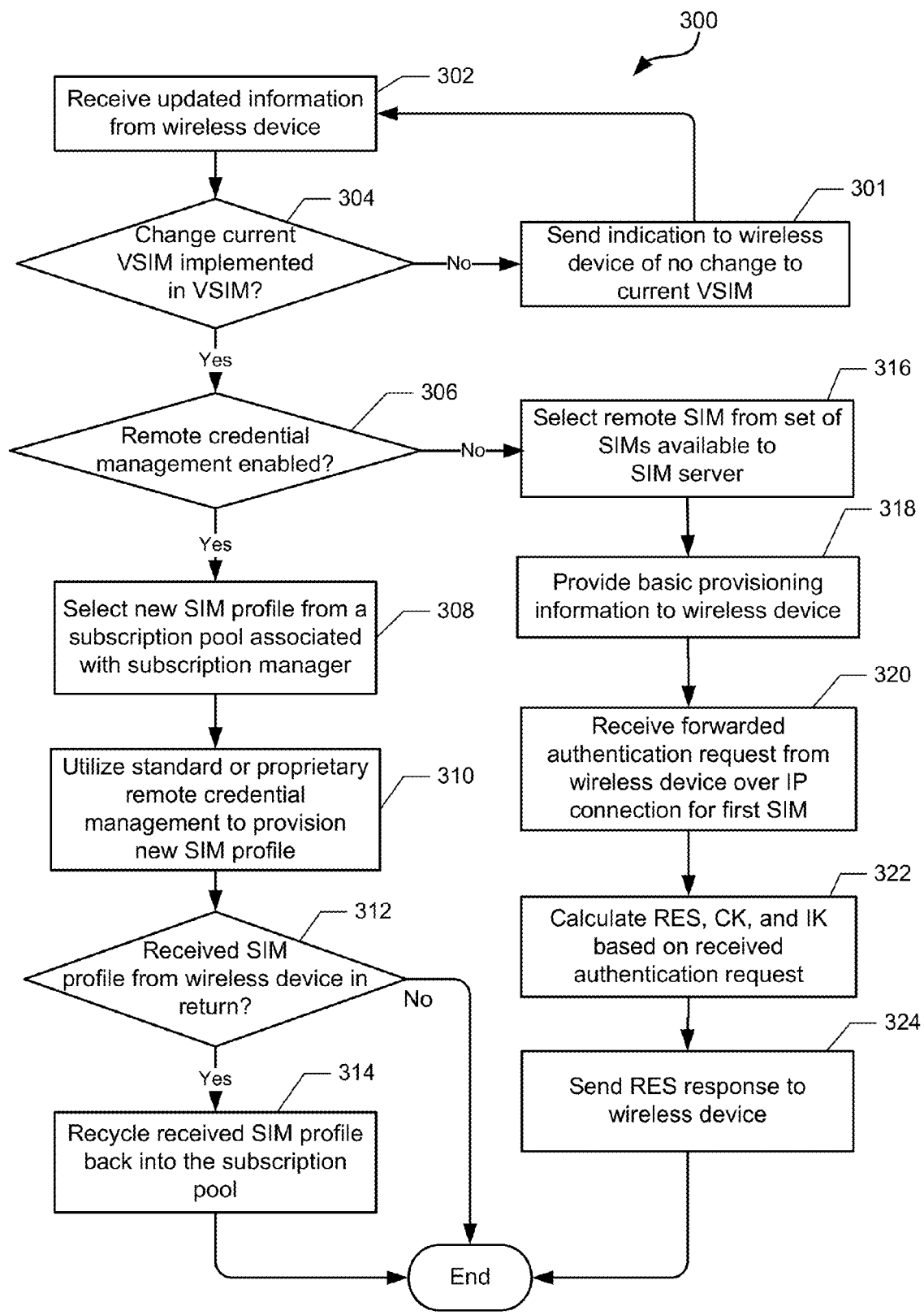
FIG. 3 is a process flow diagram illustrating a method for improving service acquisition for a SIM in an example dual-SIM wireless communication device according to various embodiments.

FIG. 3 illustrates an embodiment method 300 of managing dynamic SIM provisioning by a subscription management system. Referring to FIGS. 1-3, the operations of method 300 may be implemented by one or more processors of the provisioning server 204. Although described below with reference to a first SIM stored on a UICC and a VSIM implemented by an eUICC, the method 300 may be applied to a variety of other device configurations, including multi-SIM devices configured with more than two SIMs and multi-SIM devices that do not include an eUICC and instead implement a VSIM in software executing on the devices. Thus, references to an eUICC are for illustration purposes and are not intended to limit the scope of the claims to a physical eUICC unless specifically recited.

In block 302, a provisioning server may receive updated information from a wireless device, triggering subscription management processes. In some embodiments, the received updated information may indicate that the wireless device has moved into a new area (e.g., a new country) that is supported by different network operators from that of a previous area in which the wireless device most recently operated. For example, a wireless device, or an application currently running on the wireless device or on the eUICC, may have detected that it has changed locations, and may trigger subscription management processes by transmitting the current information to the provisioning server. In some embodiments, subscription management processes may also be triggered by conditions that do not involve a change in location. For example, subscription management processes may be triggered based on differences in the services offered by various network operators (e.g., differences in type of service, cost, quality of service (QoS), etc.), which may be indicated by, or discovered based on, the received updated information. Other examples that may trigger subscription management processes include, but are not limited to, user preferences (i.e., settings in the wireless device that may be sent to the provisioning server), data limits of tariff plans associated with current network operators, etc.

In various embodiments, the updated information received from the wireless device may include information identifying its current location (e.g., a public mobile land network (PLMN), a location area identifier (LAI), cell/subscription identifiers, etc.), a currently activated subscription (e.g., IMSI) on the eUICC (or within VSIM software executing on the device) if applicable, and/or other information. In various embodiments, the updated information may be received from the wireless device via an IP bearer or PDP context. For example, an IP bearer or PDP context may have been assigned by a network to which the first SIM is attached (e.g., an LTE, UTRAN, or other data network). In various embodiments, the updated information may be received from the wireless device in a Short Message Service (SMS) or Unstructured Supplementary Service Data (USSD) message sent over the network to which the first SIM is attached.

In determination block 304, the provisioning server may determine whether to change a current VSIM implemented in the eUICC/VSIM software of the wireless device by selecting a more suitable SIM profile. In various embodiments, such determination may be based on the received updated information and at least one internal policy for choosing service. In some embodiments, internal policies may be based on user-selected or default preferences for various criteria, such as international roaming fees, QoS, high-speed throughput, etc. Other internal policies in various embodiments may be based on certain conditions, for example, whether the remaining battery time is low, and/or whether the device is participating in a particular type of communication, such as a voice call.

In response to determining not to change the current VSIM implemented in the eUICC/VSIM software (i.e., determination block 304="No"), the provisioning server may take no action, and may send an indication to the wireless device that no change is taken with respect to the current VSIM in block 301. The provisioning server may return to await receipt of updated information from a wireless device in block 302.

In response to determining that the current VSIM implemented in the eUICC/VSIM software should be changed (i.e., determination block 304="Yes"), the provisioning server may determine whether remote credential management procedures are enabled for the virtual network operator in that particular area in determination block 306. In response to determining that remote credential management procedures are not enabled for the virtual network operator in that area (i.e., determination block 306="No"), the provisioning server may select a remote SIM from among a set of SIMs stored on UICCs that may be available to the SIM server in block 316 as and proceed as described below.

In response to determining that remote credential management procedures are enabled (i.e., determination block 306="Yes"), the VSIM provisioning may proceed according to remote credential management described in the standards (for example, GSM Association, Official Document 12FAST.13 entitled "Embedded SIM Remote Provisioning Architecture) in block 308, including recognizing the provisioning server as being a subscription manager. Specifically, in block 308, the subscription manager (i.e., provisioning server) may select a new SIM profile from a group of SIM profiles stored in a subscription pool database associated with the subscription manager. In some embodiments, the selection of a new SIM profile from the subscription pool database may be based on one or more internal policies, some of which may overlap with the policies discussed above with reference to determination block 304.

In block 310, the subscription manager may utilize standard or proprietary remote credential management procedures to provision the new SIM profile as a VSIM on the eUICC/VSIM software of the wireless device. Such procedures may be protected by keys that are already shared between the device (or between an eUICC/VSIM software in the device) and the subscription manager, and provisioned into the eUICC/VSIM software in the wireless device. In some embodiments, the SIM profile may be a set of provisioning information that includes the virtual network operator's access algorithms and selection of data, including at least one server address (e.g., IP or URL) for the virtual network operator, IMSI, an operator controlled PLMN list, a forbidden PLMN list, and a specific authentication key ($K_i$ or K). Once the provisioning is complete, the wireless device may use the new SIM profile by sending and receiving data through the VSIM, which may provide improved roaming and/or other service enhancements.

In determination block 312, the subscription manager may determine whether it has received from the wireless device a returned SIM profile (i.e., an identifier of a SIM profile previously provided by the subscription manager to the wireless device that is not going to be used due to the provisioning accomplished in block 310). In some embodiments, after a new SIM profile is provisioned in a wireless device, the wireless device may send the previous SIM profile (or an identifier of the SIM profile) back to the subscription manager for use by another wireless device. In response to determining that the subscription manager has not received a returned SIM profile (i.e., determination block 312="No"), the subscription manager may end the provisioning process. In response to determining that the subscription manager has received a returned SIM profile (i.e., determination block 312="Yes"), the subscription manager may recycle the received SIM profile back into the subscription profile pool database in block 314, thereby allowing that SIM profile to be available to other wireless devices for which it may provide improved communication services.

As discussed with respect to determination block 306, in some embodiments remote credential management procedures may not be enabled in certain areas. In these areas, the virtual network operator may not have all of the information needed to be able to provision a SIM profile into a wireless device, particularly each SIM profile's specific authentication key $K_i$ or K. Further, while the virtual network operator may have access to a large number of SIMs in physical UICCs, such as those provided by partner network operators, the virtual network operator still may be without certain information for these SIMs, including the key $K_i$ or K.

Therefore, in response to determining that remote credential management procedures are not enabled for the virtual network operator in that area (i.e., determination block 306="No"), the provisioning server may select a remote SIM from among a set of SIMs stored on UICCs that may be available to the SIM server in block 316. Specifically, in various embodiments the virtual network operator may run a SIM remotely by implementing a SIM on the network side that acts as a SIM emulator and executes authentication calculations for the roaming devices. In such embodiments, security operations related to the second SIM may be routed to the remote SIM by the VSIM configured in the eUICC/VSIM software in the wireless device. In some embodiments, access to such SIMs stored on UICCs, which may be from different network operators and from different areas/countries, may have been provided to the virtual network operator by partner network operators. In various embodiments, connections between the selected remote SIM and the wireless device may be carried over a bearer (e.g., an IP, SMS or USSD bearer) or PDP context associated with the first SIM. Further, the bearer or context may be provided within IPSec tunneling in order to ensure security between the wireless device and the remote SIM.

In block 318, the SIM server may provide basic provisioning information to the wireless device, such as an IMSI, operator configuration data, etc. associated with the selected remote SIM. In block 320, the SIM server may receive an authentication request from the wireless device, which may be carried over an Internet connection established for the first SIM. In some embodiments, the authentication request may be encrypted with a key previously provided by the virtual network operator. In various embodiments, the authentication request may have been forwarded by the wireless device following receipt of the request from the serving network associated with the remote SIM. That is, the wireless device may delegate authentication processes to the SIM server. In various embodiments, the authentication request may have been sent to the wireless device as a result of an attempt to establish a connection on the wireless device using the serving network associated with the remote SIM (e.g., for roaming service).

In block 322, the SIM server may interact with the remote SIM to calculate an authentication result (RES), a cipher key (CK), and an integrity key (IK) based on the authentication request. In some embodiments, the CK and IK may be used for security mode command procedures for network connections built with the serving network associated with the selected remote SIM.

In block 324, the SIM server may send a response with the calculated RES to the wireless device, which may then be forwarded to the serving network associated with the selected remote SIM. The SIM server may end the provisioning process of method 350, while a voice or PDP connection may be built for the wireless device to be able to utilize the remote SIM for communications in the serving network associated with the selected remote SIM.

The various embodiments may provide efficient subscription management, thereby improving performance on the provisioning server (e.g., 204 in FIG. 2) and the wireless device (e.g., 102, 104, 202 in FIGS. 1-2). For example, performing the determination of whether to change the current SIM profile for the VSIM on the provisioning server may decrease the memory usage, processing, and/or data storage requirements on the wireless device, as well as provide the wireless device with up-to-date SIM profiles. With respect to the provisioning server, centralizing the determinations for all of the wireless devices to which service is provided may allow the service provider greater control and flexibility to manage SIM profile distribution. Another example improvement may be realized based on the limited storage of SIM profiles in the wireless device. That is, in the various embodiments, the wireless device stores only one SIM profile at a time, with the remaining SIM profile options residing, for example, in a subscription pool (e.g., 206 in FIG. 2). In this manner, memory usage/storage requirements may be reduced on the wireless device, and efficiencies may be realized on the provisioning server since the same SIM profiles can be available on an as-needed basis to multiple roaming wireless devices.

In some embodiments, additional service enhancements (not shown) may be employed by the provisioning server and/or wireless device using the subscription management system. For example, in order to reduce latency of remote SIM operation, a PDP context or evolved packet system (EPS) bearer may be constantly maintained. Further, when remote SIM operations are predicted, the wireless device may enter a connected mode and establish a connection with the SIM server in advance.

Referring to FIGS. 1-3, the wireless device (e.g., 102, 104, 202 in FIGS. 1-2) may be a DSDS device that is capable of active communication on one SIM at a time using a single RF resource. Therefore, in some embodiments implemented on a DSDS device, the RF resource may be shared between the first SIM and the VSIM in a manner that is correctly scheduled according to the remote SIM provisioning. For example, the RF resource may be allocated to the first SIM when the authentication request has been received by the DSDS device and is expected to be forwarded by the DSDS device to the SIM server device. The RF resource may be allocated to the VSIM when the calculated RES has been received from the SIM server and is scheduled to be sent to the serving network associated with the second SIM. In some embodiments, a key may be pre-shared between the remote SIM server and the wireless device (or eUICC) while registered with the virtual network operator. Such a key may be used for authentication, authorization, and/or encryption of information between the wireless device and SIM server.

When the new dynamic provisioning is completed and a new SIM profile or communication connection has been successfully created, the wireless device may utilize improved data communications, such as cheaper roaming. In some embodiments, voice service and short message service (SMS) improvements may be implemented as well. In some embodiments, a voice over IP (VoIP) gateway may be include on the home network of the virtual network operator, as well as in the visiting networks with which the virtual network operator has roaming agreements. For mobile originating calls, a roaming wireless device may be configured to place voice calls using the VSIM, which may have a provisioned SIM profile or remote SIM operations to improve service while roaming. Accordingly, the placed voice call may be routed through the roaming country VoIP gateway associated with the location of the device. For mobile terminating voice calls, call forwarding to the home country VoIP gateway may be enabled automatically upon detecting, by the wireless device, a change in location that indicate roaming (e.g., based on PLMN, LAI, etc.). Thus, a mobile terminating call to the roaming device may be routed from the calling party to a home country VoIP gateway associated with the calling party, which may be routed to the roaming country VoIP gateway associated with the area in which the roaming device is located, and received on the device through its corresponding VSIM.

In some embodiments, a roaming wireless device that has been provisioned with a first SIM and a second SIM (e.g., VSIM) using one of the approaches described above may alter its handling of SMS messages while roaming. In various embodiments, a roaming wireless device may be configured to send mobile originating SMS messages to other devices using the VSIM. Further, since SMS forwarding is not deployed by most network operators, the roaming wireless device may be configured to still receive mobile terminating SMS messages via the first SIM.

The various embodiments may allow for improvements to the business models used by various entities involved in providing service to consumers (e.g., network operators, original equipment manufacturers, etc.). In current systems, a consumer may pay a roaming service charge to a home network operator when visiting a roaming area (i.e., another country), and the home network operator may pay the visited network operator a roaming fee, for example, per usage model. In these systems, the roaming service charge paid by the consumer may be very high in some cases.

Figure 4:
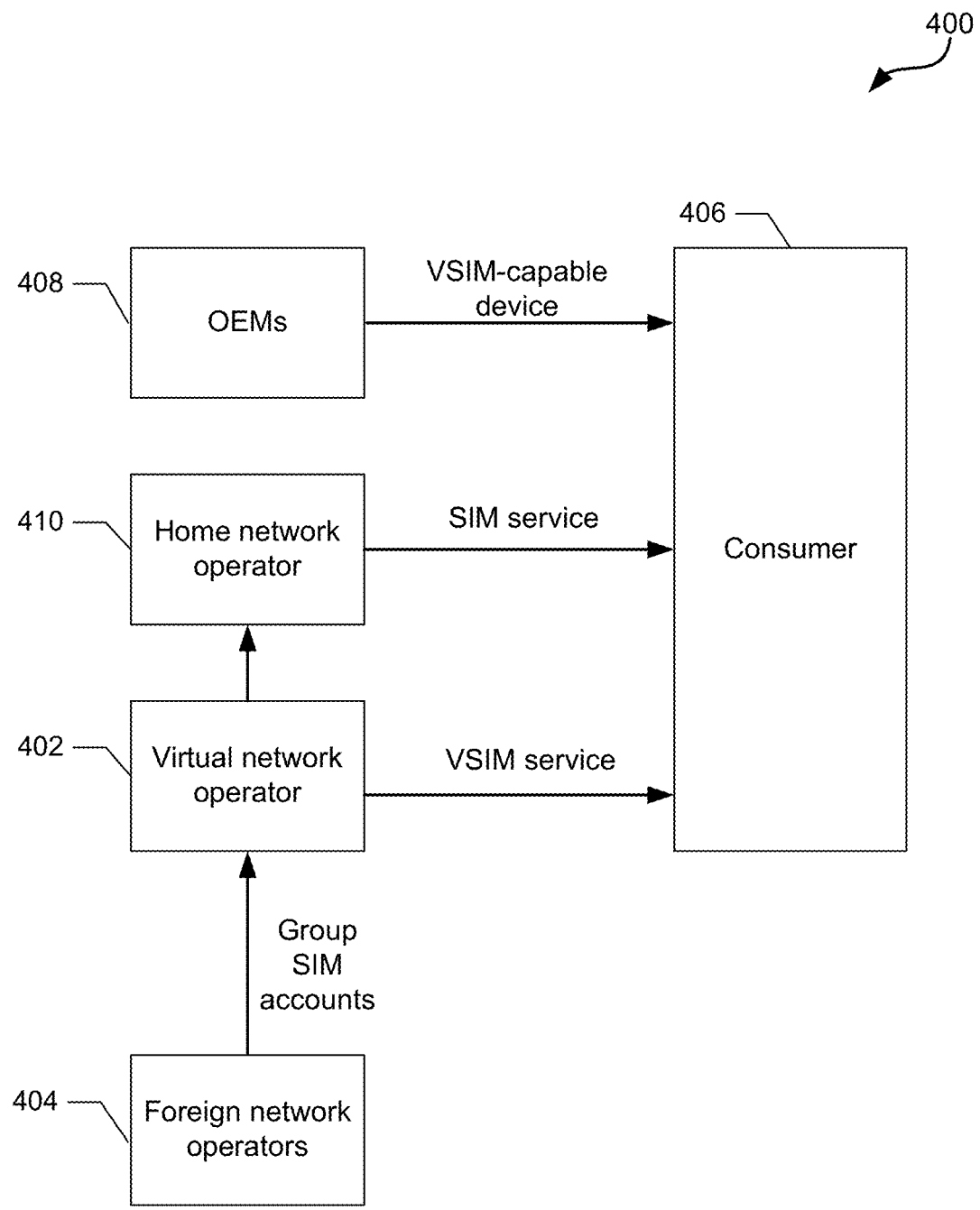
FIG. 4 is a system diagram of an example business network suitable for use with the various embodiments.

FIG. 4 illustrates a system 400 that may be used in association with the virtual SIM provisioning approaches discussed (e.g., with reference to FIGS. 1-3). While shown with respect to different entities, a single entity may perform more than one function in the system 400, either alone or in combination with related functions that are not shown. In the system 400, a virtual network operator 402 may purchase or rent "group SIM accounts" from visited network operators (i.e., foreign network operators 404), and may pay the local rate for the rented or purchased SIM accounts.

A consumer 406 in the system 400 may use a VSIM-capable device that was produced by any of a number of OEMs 408. The consumer 406 may sign up for a VSIM account with the virtual network operator 402 and pay a membership fee. Then when roaming (e.g., accessing wireless services in another country), the consumer 406 may pay the virtual network operator 402 a visit usage charge SIM fee. In other words, the virtual network operator 402 may essentially "resell" the foreign network operators' 404 services as a VSIM service. In this manner, the system 400 may reduce the roaming service charge that users conventionally pay to the home network operator 410. As such, users may conveniently access low-cost roaming services, without being required to purchase SIMs from foreign network operators 404.

Figure 5:
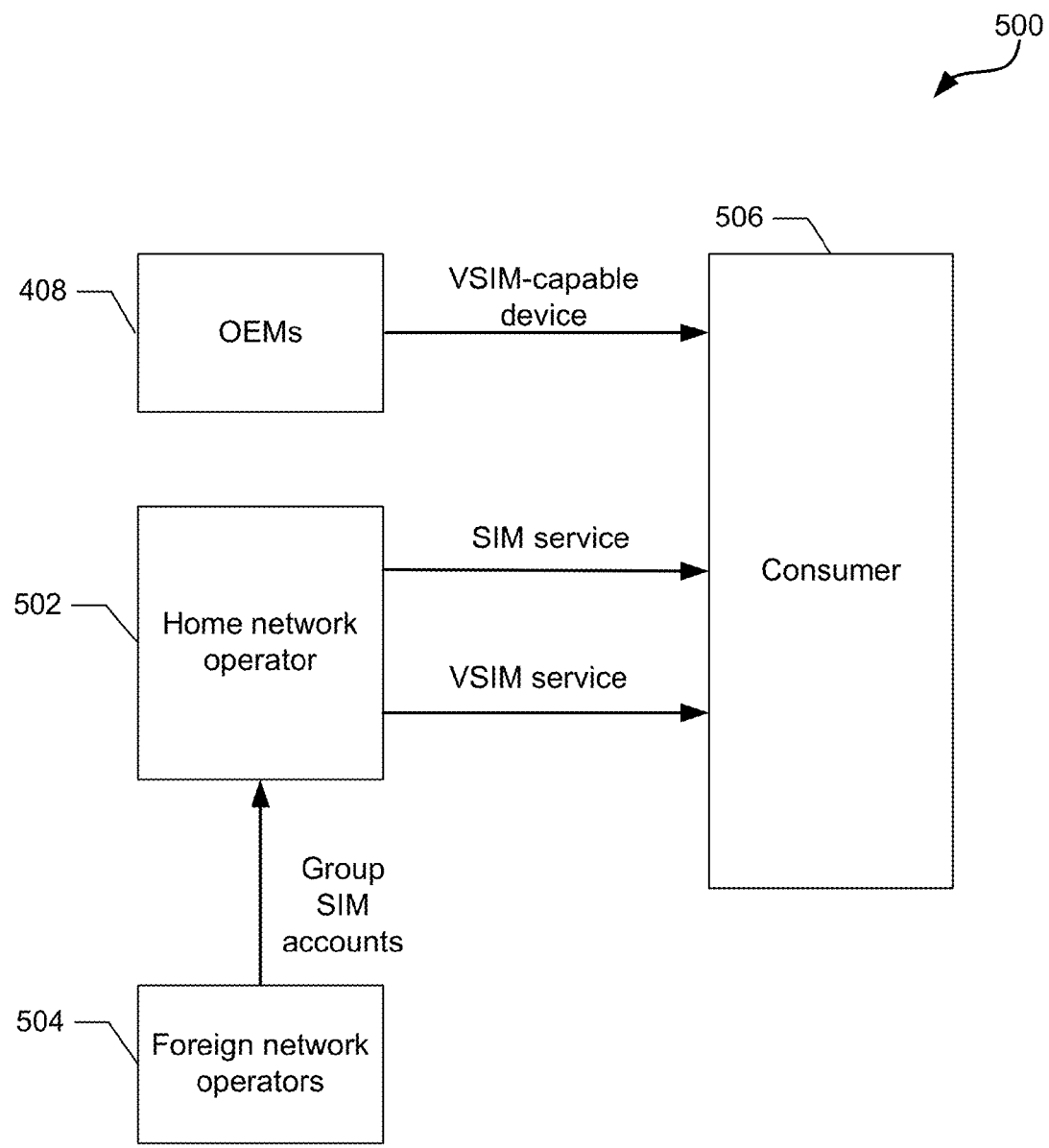
FIG. 5 is a system diagram of another example business network suitable for use with the various embodiments.

FIG. 5 illustrates another system 500 that may be used in association with the virtual SIM provisioning approaches discussed (e.g., with reference to FIGS. 1-3). In this system 500, a home network operator 502 may add VSIM services by purchasing or renting "group SIM accounts" from foreign network operators 504, paying the local rate for the SIM accounts rented or purchased. A consumer 506 with a VSIM-capable device, as produced by one or more OEM 408 (see FIG. 4), may sign up for a VSIM account with the home network operator 502 and pay a membership fee. Then when roaming (e.g., accessing wireless services in another country), the consumer 506 may pay the home network operator 502 a VSIM service fee in addition to the original SIM fees. In other words, the home network operator 502 may essentially "resell" the foreign network operators' 504 services as a VSIM service. In this manner, the system 500 may the roaming service charge that users conventionally pay to the home network operator 502. As such, users may conveniently access low-cost roaming services, without being required to purchase SIMs from foreign network operators 504.

With reference to FIGS. 1-5, in various embodiments, the eUICC may be an embedded physical UICC or an embedded soft UICC (i.e., implemented as VSIM software executing on the wireless communication device). However, smart card vendors and some network operators may choose to limit the eUICC to an embedded physical UICC only.

Figure 6:
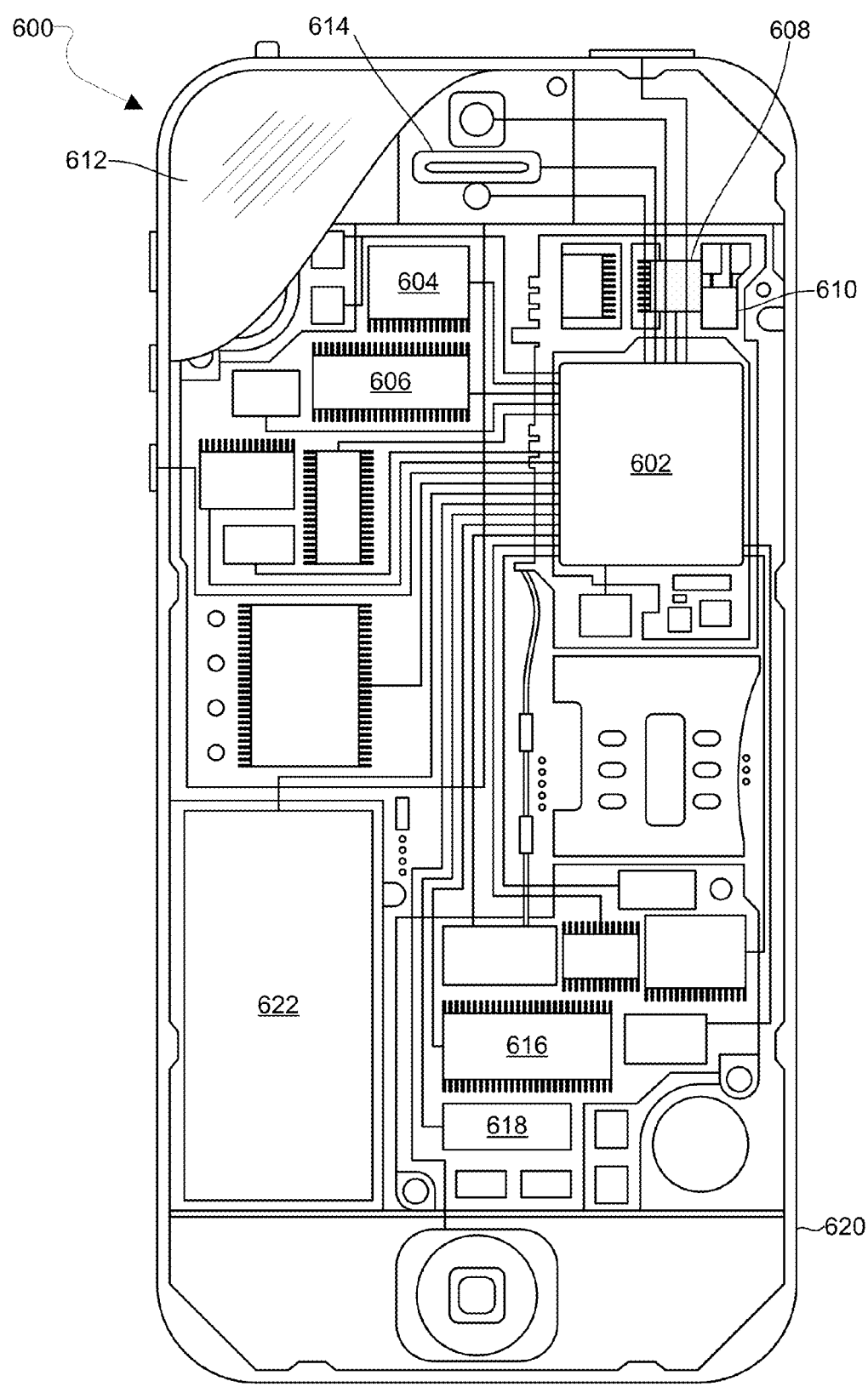
FIG. 6 is a component diagram of an example wireless communication device suitable for use with various embodiments.

The various embodiments (including, but not limited to, the embodiments discussed with reference to FIG. 3) may be implemented in any of a variety of wireless communication devices, an example of which is illustrated in FIG. 6. For example, a wireless device 600 (which may correspond, for example, to wireless devices 102, 202 in FIGS. 1-2) may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 processor 602 may be coupled to two or more radio signal transceivers 608, 616 and antennae 610 that enable communications via two or more cellular networks for sending and receiving voice and data calls. The transceivers 608, 616 and antennae 610 may be used with the above-mentioned circuitry to implement the various wireless transmission modem stacks and interfaces.

The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
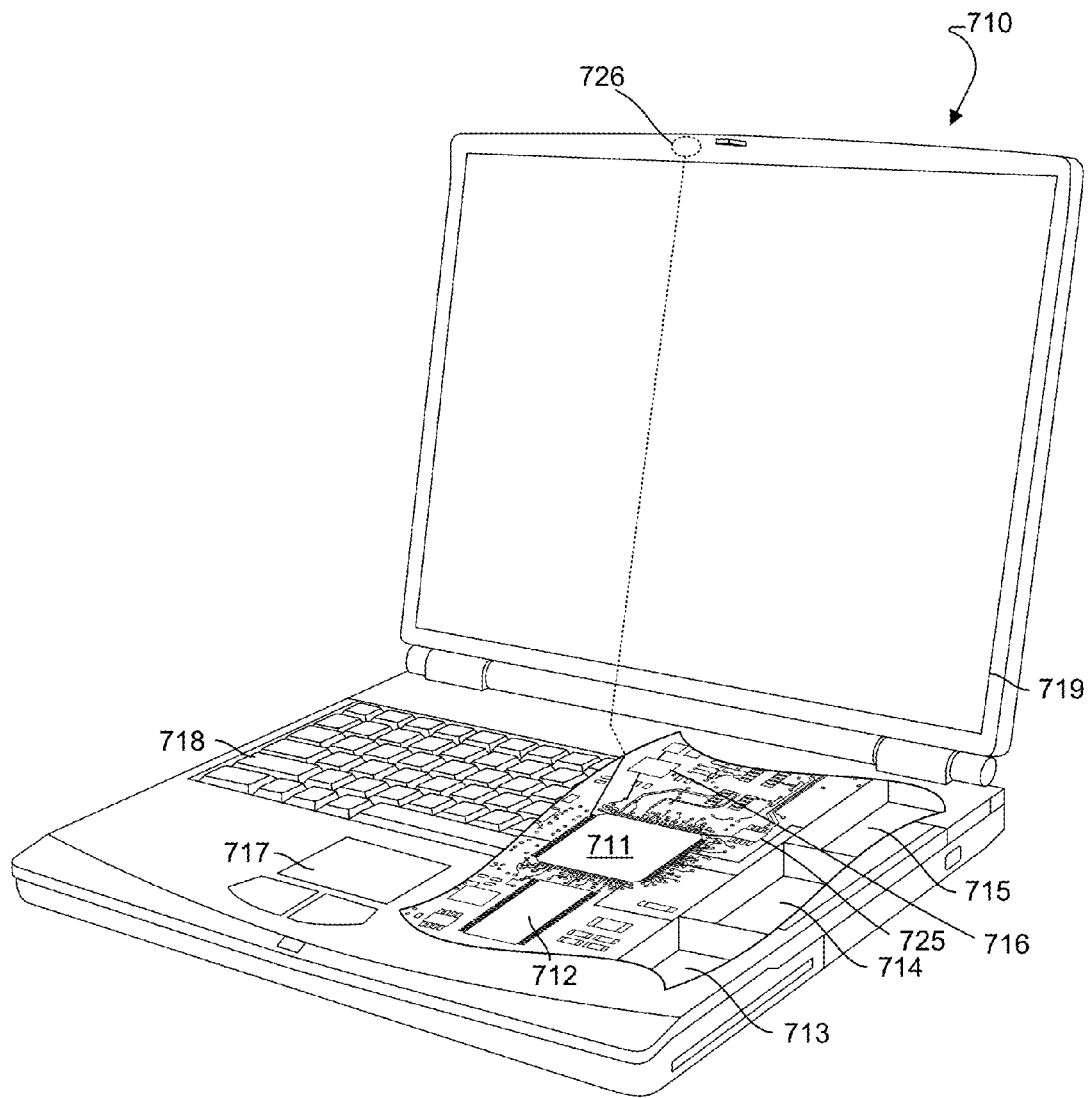
FIG. 7 is a component diagram of another example wireless communication device suitable for use with the various embodiments.

The various embodiments (including, but not limited to, the embodiments described above with reference to FIG. 3) may also be implemented within a variety of personal computing devices, such as a laptop computer 700 (which may correspond to wireless devices 102, 104, 202 in FIGS. 1-2) as illustrated in FIG. 7. A laptop computer 700 will typically include a processor 711 coupled to volatile memory 712 and a large capacity nonvolatile memory, such as a disk drive 713 of Flash memory. The computer 700 may also include a floppy disc drive 714 and/or a compact disc (CD) drive 715 coupled to the processor 711. The computer 700 may also include a number of connector ports coupled to the processor 711 for establishing data connections or receiving external memory devices, such as a USB or FireWire® connector sockets, or other network connection circuits for coupling the processor 711 to a network. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be use in conjunction with the various embodiments.

Figure 8:
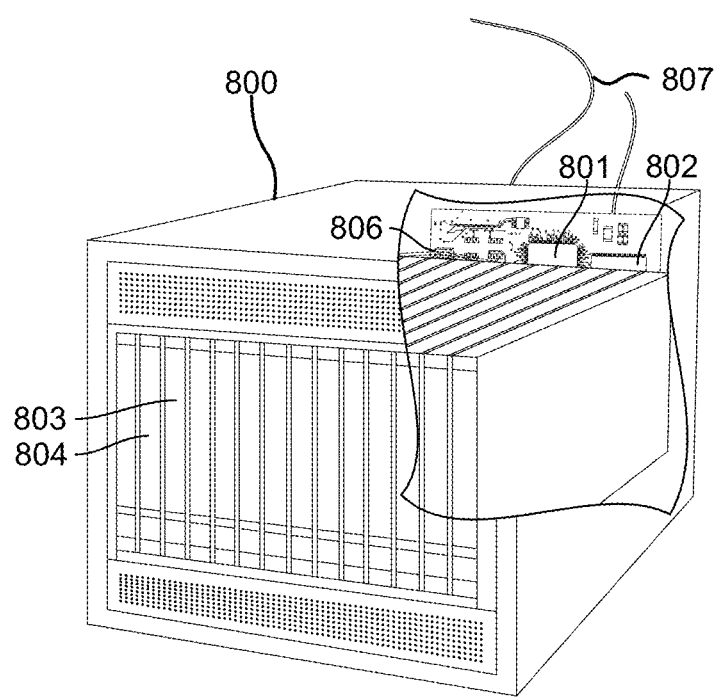
FIG. 8 is a component diagram of an example server suitable for use with the various embodiments

The various embodiments (including, but not limited to, the embodiments described with reference to FIG. 3-5) may also be implemented on any of a variety of commercially available server devices, such as the server 800 illustrated in FIG. 8. For example, server 800 (which may correspond, for example, to 116, 118, 204, 208, 402, 408, 410, 502 in FIGS. 1-5) typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing network interface connections with a network 807, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 602, 711, 801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 606, 712, 713, 802, 803 before they are accessed and loaded into the processors 602, 711, 801. The processors 602, 711, 801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, 711, 801 including internal memory or removable memory plugged into the wireless device and memory within the processors 602, 711, 801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for dynamically provisioning a wireless device having a first subscriber identity module (SIM) and a virtual SIM (VSIM), wherein the first SIM is stored on a universal integrated circuit card (UICC), the method comprising:
   receiving, at a provisioning server, updated information from the wireless device;
   determining, by the provisioning server, whether the VSIM should be changed based at least in part on the received updated information;
   determining whether remote credential management procedures are enabled by the provisioning server in response to determining that the VSIM should be changed; and
   in response to determining that remote credential management procedures are not enabled by the provisioning server:
      selecting, by the provisioning server, a new SIM profile by selecting a remote SIM from a set of remote SIMs available to the provisioning server; and
      provisioning the new SIM profile in the wireless device by remotely running the selected remote SIM, wherein security operations related to the new SIM profile are routed by the VSIM to the selected remote SIM.

2. The method of claim 1, wherein receiving the updated information from the wireless device comprises receiving at least one of:
   information indicating whether the wireless device is currently roaming;
   information indicating differences in at least one of quality, cost, and type of services offered by a plurality of network operators providing local service;
   a user preference implemented as a setting on the wireless device; and
   a data limit of a tariff plan currently associated with the VSIM.

3. The method of claim 1, further comprising, in response to determining that remote credential management procedures are enabled by the provisioning server:
   selecting, by the provisioning server, the new SIM profile from a plurality of SIM profiles associated with the provisioning server; and
   provisioning the new SIM profile in the VSIM using the remote credential management procedures.

4. The method of claim 3, further comprising:
   determining, in the provisioning server, whether a returned SIM profile was received from the wireless device following provisioning of the new SIM profile; and
   recycling the returned SIM profile into a subscription pool database in response to determining that a returned SIM profile was received from the wireless device.

5. The method of claim 1, wherein receiving the updated information from the wireless device comprises receiving the updated information through one of:
   an Internet protocol (IP) bearer provided by a serving network associated with the first SIM of the wireless device; and
   a Short Message Service (SMS) or Unstructured Supplementary Service Data (USSD) communication sent over the serving network associated with the first SIM of the wireless device.

6. The method of claim 1, wherein provisioning the new SIM profile in the wireless device is protected by keys shared between the wireless device and the provisioning server.

7. The method of claim 1, further comprising, in response to determining that remote credential management procedures are enabled by the provisioning server:
   selecting, by the provisioning server, the new SIM profile from a plurality of SIM profiles associated with the provisioning server,
   wherein selecting the new SIM profile comprises evaluating criteria across SIM profiles in a subscription pool database, wherein the criteria include one or more of a cost of international roaming service, a quality of service, a high-speed data throughput, and support for a particular type of communication.

8. The method of claim 1, wherein the VSIM is implemented as one of an embedded UICC (eUICC) and a software module configured to execute a VSIM application.

9. The method of claim 1, wherein
remotely running the selected remote SIM comprises:
providing basic provisioning information from the remote SIM to the VSIM via secure tunneling of an IP bearer established by the first SIM; and
performing authentication processes between the remote SIM and a serving network associated with the remote SIM via an IP bearer established by the first SIM.

10. The method of claim 1, wherein:
determining whether remote credential management procedures are enabled by the provisioning server is based on whether, in a current area, a virtual network operator associated with the provisioning server has been granted access to authentication keys needed to provision SIM profiles into the wireless device, and
in response to determining that remote credential management procedures are enabled:
selecting, by the provisioning server, the new SIM profile from a plurality of SIM profiles associated with the provisioning server; and
provisioning the new SIM profile in the VSIM using standard or proprietary remote credential management procedures, wherein the procedures are protected by keys that are shared between the wireless device and the provisioning server.

11. The method of claim 1, further comprising:
establishing, through a virtual network operator associated with the provisioning server, a VSIM account with the wireless device; and
receiving a payment to the virtual network operator from the established VSIM account upon selection of the new SIM profile,
wherein a plurality of SIM profiles associated with the provisioning server each correspond to one of a plurality of foreign network operators, and wherein the virtual network operator pays a local rate to each of the foreign network operators for the corresponding SIM profiles.

12. The method of claim 11, wherein the virtual network operator comprises a home network operator associated with the wireless device.

13. A provisioning server in a subscription management system, comprising:
a network interface configured to connect to a wireless communication network;
a memory; and
a processor coupled to the network interface and the memory, wherein the processor is configured to:
receive updated information from a wireless device having a first subscriber identity module (SIM) and a virtual SIM (VSIM), wherein the first SIM is stored on a universal integrated circuit card (UICC);
determine whether the VSIM should be changed based at least in part on the received updated information;
determine whether remote credential management procedures are enabled by the provisioning server in response to determining that the VSIM should be changed; and
in response to determining that remote credential management procedures are not enabled by the provisioning server:
select a new SIM profile by selecting a remote SIM from a set of remote SIMs available to the provisioning server; and
provision the new SIM profile in the wireless device by remotely running the selected remote SIM, wherein security operations related to the new SIM profile are routed by the VSIM to the selected remote SIM.

14. The provisioning server of claim 13, wherein the processor is further configured to receive the updated information from the wireless device by receiving at least one of:
information indicating whether the wireless device is currently roaming;
information indicating differences in at least one of quality, cost, and type of services offered by a plurality of network operators providing local service;
a user preference implemented as a setting on the wireless device; and
a data limit of a tariff plan currently associated with the VSIM.

15. The provisioning server of claim 13, wherein the processor is further configured, in response to determining that remote credential management procedures are enabled by the provisioning server, to:
select the new SIM profile from a plurality of SIM profiles associated with the provisioning server; and
provision the new SIM profile in the VSIM using the remote credential management procedures.

16. The provisioning server of claim 15, wherein the processor is further configured to:
determine whether a returned SIM profile was received from the wireless device following provisioning the new SIM profile; and
recycle the returned SIM profile into a subscription pool database in response to determining that a returned SIM profile was received from the wireless device.

17. The provisioning server of claim 13, wherein the processor is further configured to receive the updated information from the wireless device by receiving the updated information through one of:
an Internet protocol (IP) bearer provided by a serving network associated with the first SIM of the wireless device; and
a Short Message Service (SMS) or Unstructured Supplementary Service Data (USSD) communication sent over the serving network associated with the first SIM of the wireless device.

18. The provisioning server of claim 13, wherein the processor is further configured to share keys with the wireless device that protect provisioning the new SIM profile in the wireless device.

19. The provisioning server of claim 13, wherein the processor is further configured, in response to determining that remote credential management procedures are enabled by the provisioning server, to:
select the new SIM profile from a plurality of SIM profiles associated with the provisioning server by evaluating criteria across the plurality of SIM profiles,
wherein the criteria include one or more of a cost of international roaming service, a quality of service, a high-speed data throughput, and support for a particular type of communication.

20. The provisioning server of claim 13, wherein the processor is further configured to implement the VSIM as one of an embedded UICC (eUICC) and a software module configured to execute a VSIM application.

21. The provisioning server of claim 13, wherein the processor is further configured to
  remotely run the selected remote SIM by:
    providing basic provisioning information from the remote SIM to the VSIM via secure tunneling of an IP bearer established by the first SIM; and
    performing authentication processes between the remote SIM and a serving network associated with the remote SIM via an IP bearer established by the first SIM.

22. The provisioning server of claim 13, wherein the processor is further configured to:
  determine whether remote credential management procedures are enabled based on whether, in a current area, a virtual network operator associated with the provisioning server has been granted access to authentication keys needed to provision SIM profiles into the wireless device; and
  in response to determining that remote credential management procedures are enabled:
    select the new SIM profile from a plurality of SIM profiles associated with the provisioning server; and
    provision the new SIM profile in the wireless device using standard or proprietary remote credential management procedures, wherein the procedures are protected by keys that are shared between the wireless device and the provisioning server.

23. The provisioning server of claim 13, wherein the processor is further configured to:
  establish, through a non-transitory processor-readable medium associated with a virtual network operator, a VSIM account with the wireless device; and
  receive a payment to the virtual network operator from the established VSIM account upon selection of the new SIM profile,
  wherein a plurality of associated SIM profiles each correspond to one of a plurality of foreign network operators, and wherein the virtual network operator pays a local rate to each of the foreign network operators for the corresponding SIM profiles.

24. The provisioning server of claim 23, wherein the virtual network operator comprises a home network operator associated with the wireless device.

25. A subscription management system, comprising:
  means for receiving updated information from a wireless device having a first subscriber identity module (SIM) and a virtual SIM (VSIM), wherein the first SIM is stored on a universal integrated circuit card (UICC);
  means for determining whether the VSIM should be changed based at least in part on the received updated information;
  means for determining whether remote credential management procedures are enabled by a provisioning server in response to determining that the VSIM should be changed; and
  in response to determining that remote credential management procedures are not enabled by the provisioning server:
    means for selecting a new SIM profile by selecting a remote SIM from a set of remote SIMs available to the provisioning server; and
    means for provisioning the new SIM profile in the wireless device by remotely running the selected remote SIM, wherein security operations related to the new SIM profile are routed by the VSIM to the selected remote SIM.

26. A non-transitory processor-readable medium having stored thereon processor-executable instructions configured to cause a processor of a provisioning server to perform operations comprising:
  receiving updated information from a wireless device having a first subscriber identity module (SIM) and a virtual SIM (VSIM), wherein the first SIM is stored on a universal integrated circuit card (UICC);
  determining whether the VSIM should be changed based at least in part on the received updated information;
  determining whether remote credential management procedures are enabled by the provisioning server in response to determining that the VSIM should be changed; and
  in response to determining that remote credential management procedures are not enabled by the provisioning server:
    selecting a new SIM profile by selecting a remote SIM from a set of remote SIMs available to the provisioning server; and
    provisioning the new SIM profile in the wireless device by remotely running the selected remote SIM, wherein security operations related to the new SIM profile are routed by the VSIM to the selected remote SIM.

27. The non-transitory processor-readable medium of claim 26, wherein the stored processor-executable instructions are configured to cause the processor of the provisioning server to perform operations such that receiving the updated information from the wireless device comprises receiving at least one of:
  information indicating whether the wireless device is currently roaming;
  information indicating differences in at least one of quality, cost, and type of services offered by a plurality of network operators providing local service;
  a user preference implemented as a setting on the wireless device; and
  a data limit of a tariff plan currently associated with the VSIM.

28. The non-transitory processor-readable medium of claim 26, wherein the stored processor-executable instructions are configured to cause the processor of the provisioning server to perform operations further comprising:
  in response to determining that remote credential management procedures are enabled by the provisioning server:
    selecting the new SIM profile from a plurality of SIM profiles associated with the provisioning server; and
    provisioning the new SIM profile in the VSIM using the remote credential management procedures.

29. The non-transitory processor-readable medium of claim 28, wherein the stored processor-executable instructions are configured to cause the processor of the provisioning server to perform operations further comprising:
  determining in the provisioning server whether a returned SIM profile was received from the wireless device following provisioning of the new SIM profile; and
  recycling the returned SIM profile into a subscription pool database in response to determining that a returned SIM profile was received from the wireless device.

30. The non-transitory processor-readable medium of claim 26, wherein the stored processor-executable instructions are configured to cause the processor of the provisioning server to perform operations such that
  remotely running the selected remote SIM is performed by:

providing basic provisioning information from the remote SIM to the VSIM via secure tunneling of a bearer established by the first SIM; and performing authentication processes between the remote SIM and a serving network associated with the remote SIM via a bearer established by the first SIM.

* * * * *